(12) United States Patent
Ando

(10) Patent No.: US 9,517,760 B2
(45) Date of Patent: Dec. 13, 2016

(54) HYBRID VEHICLE

(75) Inventor: Daigo Ando, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 159 days.

(21) Appl. No.: 14/368,965

(22) PCT Filed: Dec. 28, 2011

(86) PCT No.: PCT/JP2011/080520
§ 371 (c)(1),
(2), (4) Date: Jun. 26, 2014

(87) PCT Pub. No.: WO2013/099029
PCT Pub. Date: Jul. 4, 2013

(65) Prior Publication Data
US 2014/0365056 A1 Dec. 11, 2014

(51) Int. Cl.
*B60W 20/00* (2016.01)
*F02D 41/00* (2006.01)
(Continued)

(52) U.S. Cl.
CPC .............. *B60W 20/10* (2013.01); *B60K 6/445* (2013.01); *B60W 10/06* (2013.01); *B60W 10/08* (2013.01); *B60W 20/00* (2013.01); *F02D 41/04* (2013.01); *F02D 41/30* (2013.01); *F02N 11/0829* (2013.01); *B60W 2710/0688* (2013.01); *B60Y 2306/03* (2013.01); *F01M 13/00* (2013.01); *F01M 2001/165* (2013.01); *F02D 41/0025* (2013.01); *F02D 2250/08* (2013.01);
(Continued)

(58) Field of Classification Search
None
See application file for complete search history.

(56) References Cited

U.S. PATENT DOCUMENTS 6,131,680 A 10/2000 Nii et al.
2006/0240940 A1 10/2006 Saito
(Continued)

FOREIGN PATENT DOCUMENTS

JP 09-308012 A 11/1997
JP 11-210521 A 8/1999
(Continued)

*Primary Examiner* — Jerrah Edwards
*Assistant Examiner* — Demetra Smith-Stewart
(74) *Attorney, Agent, or Firm* — Andrews Kurth Kenyon LLP

(57) ABSTRACT

A hybrid vehicle according to one embodiment of the present invention has: an internal combustion engine including an in-cylinder fuel injection valve and a crank ventilation system; a motor; a power transmission mechanism connecting a drive shaft of the vehicle and the engine to allow torque transmission therebetween and connecting the drive shaft and the motor to allow torque transmission therebetween; and a control device. The control device controls output torques of the engine and the motor so as to exert an equal torque to a user requiring torque on the drive shaft. Furthermore, the control device stops the engine when an engine stop condition that included a condition that a coolant water temperature is equal to or higher than an intermittency allowance temperature, and start the engine when an engine start condition is satisfied.

6 Claims, 11 Drawing Sheets

(51) Int. Cl.

| | | |
|---|---|---|
| *F02D 41/30* | (2006.01) | |
| *F02D 28/00* | (2006.01) | |
| *B60K 6/445* | (2007.10) | |
| *B60W 10/06* | (2006.01) | |
| *F02N 11/08* | (2006.01) | |
| *B60W 10/08* | (2006.01) | |
| *F02D 41/04* | (2006.01) | |
| *F01M 13/00* | (2006.01) | |
| *F01M 1/16* | (2006.01) | |

(52) U.S. Cl.
CPC .... *F02D 2250/11* (2013.01); *F02N 2200/023* (2013.01); *Y02T 10/48* (2013.01); *Y02T 10/6239* (2013.01)

(56) References Cited

U.S. PATENT DOCUMENTS

| | | |
|---|---|---|
| 2009/0063009 A1 | 3/2009 | Jinno |
| 2010/0241297 A1 | 9/2010 | Aoki et al. |
| 2011/0056189 A1* | 3/2011 | Hlrowatarl ............ F01M 13/00 60/284 |
| 2011/0120789 A1* | 5/2011 | Teraya .................. B60K 6/445 180/65.25 |
| 2012/0109498 A1 | 5/2012 | Murase |
| 2015/0239464 A1* | 8/2015 | Ando .................... B60K 6/445 701/22 |

FOREIGN PATENT DOCUMENTS

| | | |
|---|---|---|
| JP | 2004-036626 A | 2/2004 |
| JP | 2006-299991 A | 11/2006 |
| JP | 2007-083951 A | 4/2007 |
| JP | 2008-180215 A | 8/2008 |
| JP | 2008-297984 A | 12/2008 |
| JP | 2009-051288 A | 3/2009 |
| JP | 2009-126450 A | 6/2009 |
| JP | 2011-012628 A | 1/2011 |
| JP | WO 2015082967 A1 * | 6/2015 .......... B60W 20/106 |

* cited by examiner

HYBRID VEHICLE

CROSS-REFERENCE TO RELATED APPLICATIONS

This is a national phase application based on the PCT International Patent Application No. PCT/JP2011/080520 filed Dec. 28, 2011, the entire contents of which are incorporated herein by reference.

TECHNICAL FIELD

This invention relates to a hybrid vehicle that comprises driving sources (power sources) such as an internal combustion engine including an in-cylinder fuel injection valve and a motor and runs controlling output torque of the driving sources.

BACKGROUND ART

Hybrid vehicles are equipped with an internal combustion engine(s) and a motor(s) as driving source to generate drive power to run the vehicles. In other words, hybrid vehicles run by transferring torque generated with at least one of the engine(s) and the motor(s) toward a drive shaft(s) connected to drive wheels of the vehicles.

Hybrid vehicles may be equipped with "an internal combustion engine using fuel injection valves that directly inject fuel in combustion chambers (cylinders)". Such fuel injection valve is hereinafter referred to as "in-cylinder fuel injection valve", and such engine using the in-cylinder fuel injection valve is hereinafter referred to as "in-cylinder fuel injection type engine". The in-cylinder fuel injection type engine can decrease temperature in the cylinder due to the direct fuel injection in the combustion chamber. Then, the engine can set ignition timings at a more advanced timing since the decrease of the temperature can prevent knocking of the engine. As a result, output torque and fuel efficiency of the engine can be enhanced.

On the other hand, regarding the in-cylinder fuel injection type engine, fuel adherence to an inner surface of the combustion chamber is likely to occur especially when the temperature of the engine is low. The adhered fuel to the inner surface of the combustion chamber intrudes in a crankcase through a clearance gap between the inner surface and a piston then to be mixed in lubrication oil (engine oil) of the engine. In other words, the lubrication oil is diluted with fuel. The mixed fuel in the lubrication oil evaporates at once when the temperature of the engine increases. The evaporated fuel is returned to an intake system of the engine by a PCV system (Positive Crankcase Ventilation system). As a result, the air-fuel ratio of air-fuel mixture supplied to the engine (air-fuel mixture of the engine) may not be controlled appropriately.

In view of the above, one of conventional technology is designed to change operating points of the engine (the engine rotation speed and the engine load) depending on the amount of fuel mixed in the lubrication oil (hereinafter referred to as "amount of mixed fuel" or "amount of diluting fuel") so that the amount of mixed fuel does not reach to an excessive amount (for example, see the patent literature 1).

CITATION LIST

Patent Literature 1: JP 2008-297984 A

SUMMARY OF INVENTION

On the other hand, such hybrid vehicles are designed to stop the engine in the cases such that the amount of torque to drive the vehicle (in other words, torque required by user) can be satisfied by using output torque of the motor without using output torque of the engine. Furthermore, such hybrid vehicles are designed to start the engine in the cases such that the amount of torque required by user cannot be satisfied unless using output torque of the engine. This operation of the engine, in which the engine is intermittently driven, is referred to as intermittent drive.

The intermittent drive may cause, however, an increase of the amount of mixed fuel in the case that the engine is repeatedly started when the temperature of the inner surface of the combustion chamber of the engine is low since the fuel injection amount is set to be a large amount when the engine is started. Consequently, the intermittent drive may cause a situation that the mixed fuel in the lubrication oil evaporates at once in the crankcase when the temperature of the engine increases then to be returned to the intake system of the engine by the PCV system. As a result, for example, improper diagnoses may occur so that some parts to configure fuel supply system are abnormal. Or, the emissions of the engine may be degraded since the air-fuel ratio of the engine cannot be controlled to target values thereof.

The present invention is to solve the above problem. That is, one of objects of the present invention is to provide a hybrid vehicle to prevent an excessive amount of mixed fuel by regulating the intermittent drive.

The hybrid vehicle of the present invention, for solving the above technical problem, comprises:

an internal combustion engine including: an in-cylinder fuel injection valve to allow direct fuel injection in a combustion chamber, and a crank ventilation system;

a motor;

a power transmission mechanism connecting a drive shaft of the vehicle and the engine to allow torque transmission therebetween and connecting the drive shaft and the motor to allow torque transmission therebetween; and a control device having a configuration:

to control "output torque of the engine and output torque of the motor" so as to exert "an equal torque to a user requiring torque" on the drive shaft, which user requiring torque is "a torque required on the drive shaft and determined depending on an acceleration control amount by the user".

Furthermore, the control device has a configuration to stop the engine when a "predetermined engine stop condition" is satisfied, and start the engine when a predetermined engine start condition is satisfied, which engine stop condition including "a condition that a coolant water temperature of the engine is equal to or higher than a intermittency allowance temperature".

Additionally, the control device further has a configuration:

to estimate a mixed fuel amount, which is an amount of fuel mixed in lubrication oil of the engine, and to set the intermittency allowance temperature to rise with increasing amount of the estimated mixed fuel amount.

The intermittency allowance temperature in the above hybrid vehicle is set to rise with increasing amount of the mixed fuel amount. Thus, when the mixed fuel amount increases, the engine stop condition is not satisfied until the coolant water temperature rises to "the intermittency allowance temperature", which is set to a high value, and hence a repeat of "engine-start(s) under the condition that the coolant water temperature of the engine is low" is avoided. Furthermore, the engine continues to be driven until the coolant water temperature becomes higher than "the intermittency allowance temperature" (in other words, the engine is not stopped because of the intermittent drive), thus the mixed fuel in the lubrication oil gradually evaporates meanwhile, and then the evaporated fuel is returned to an intake system of the engine through the crank ventilation system. As a result, the hybrid vehicle is able to avoid excessive increase of the mixed fuel amount.

Furthermore, the control device may further have a configuration:

(1) to calculate an increased amount of fuel to increase with decreasing temperature of the coolant water, and increase an amount of fuel injected from the in-cylinder fuel injection valve depending on the increased amount; and (2) to increase the estimated mixed fuel amount when the following conditions are satisfied: the engine is driven; the coolant water temperature is lower than a first threshold coolant water temperature; and the increased amount is equal to or larger than a predetermined threshold increased amount.

When fuel injected from the in-cylinder fuel injection valve is increased because of the increased amount under the condition that the coolant water temperature is lower than the first threshold coolant water temperature, a large amount of fuel adheres to a wall surface of the combustion chamber, and then the mixed fuel amount increases. Hence, the hybrid vehicle of the above configuration is able to relatively-accurately estimate the mixed fuel amount by using a simple logic.

The control device may further have a configuration to increase the estimated mixed fuel amount with increasing "number of start of the engine" under a condition that the coolant water temperature is equal to or lower than the first threshold coolant water temperature.

A larger amount of fuel is generally injected when the engine is started compared to when the engine is normally operated (i.e., when the engine is operated after a predetermined time has passed since the start of the engine). Furthermore, even if the amount of fuel is not increased when the engine is started, a large amount of fuel adheres to the wall surface of the combustion chamber before air-fuel mixture starts burning. In view of the above, the mixed fuel amount increases when the engine is started under the condition that the coolant water temperature is equal to or lower than the first threshold coolant water temperature. Hence, the hybrid vehicle of the above configuration is able to relatively-accurately estimate the mixed fuel amount by using a simple logic.

The mixed fuel in the lubrication oil evaporates when the engine is operated under the condition that the engine's temperature is high (that is, under the condition that the coolant water temperature is higher than "a second threshold coolant water temperature, which is equal to or higher than the first threshold coolant water temperature"), then the evaporated fuel is returned to an intake system of the engine through the crank ventilation system. As a result, the mixed fuel amount decreases.

In view of the above, the control device may further have a configuration to decrease the estimated mixed fuel amount when the following conditions are satisfied: the engine is driven; and the coolant water temperature is higher than "a second threshold coolant water temperature, which is equal to or higher than the first threshold coolant water temperature". Thereby, the hybrid vehicle of the above configuration is able to relatively-accurately estimate the mixed fuel amount by using a simple logic.

Furthermore, the control device may further have a configuration to change the intermittency allowance temperature from a low threshold temperature to a "high threshold temperature, which is higher than the low threshold temperature", when the estimated mixed fuel amount is equal to or larger than a threshold mixed fuel amount.

The intermittency allowance temperature in this configuration is changed to the high threshold temperature only when the estimated mixed fuel amount becomes equal to or larger than the threshold mixed fuel amount. Thus, in the case that the estimated mixed fuel amount is smaller than the threshold mixed fuel amount, the intermittent drive is allowed when the coolant water temperature is equal to or higher than the low threshold temperature. As a result, the hybrid vehicle is able to enhance fuel efficiency thereof while avoiding excessive increase of the mixed fuel amount compared to the case that the intermittency allowance temperature is constantly set to the high threshold temperature regardless of the mixed fuel amount.

Other objects, other features and advantages gained therefrom of the present invention will be readily apparent from the description of the embodiments of the present invention described with reference to the following drawings.

DESCRIPTION OF EMBODIMENTS

Figure 1:
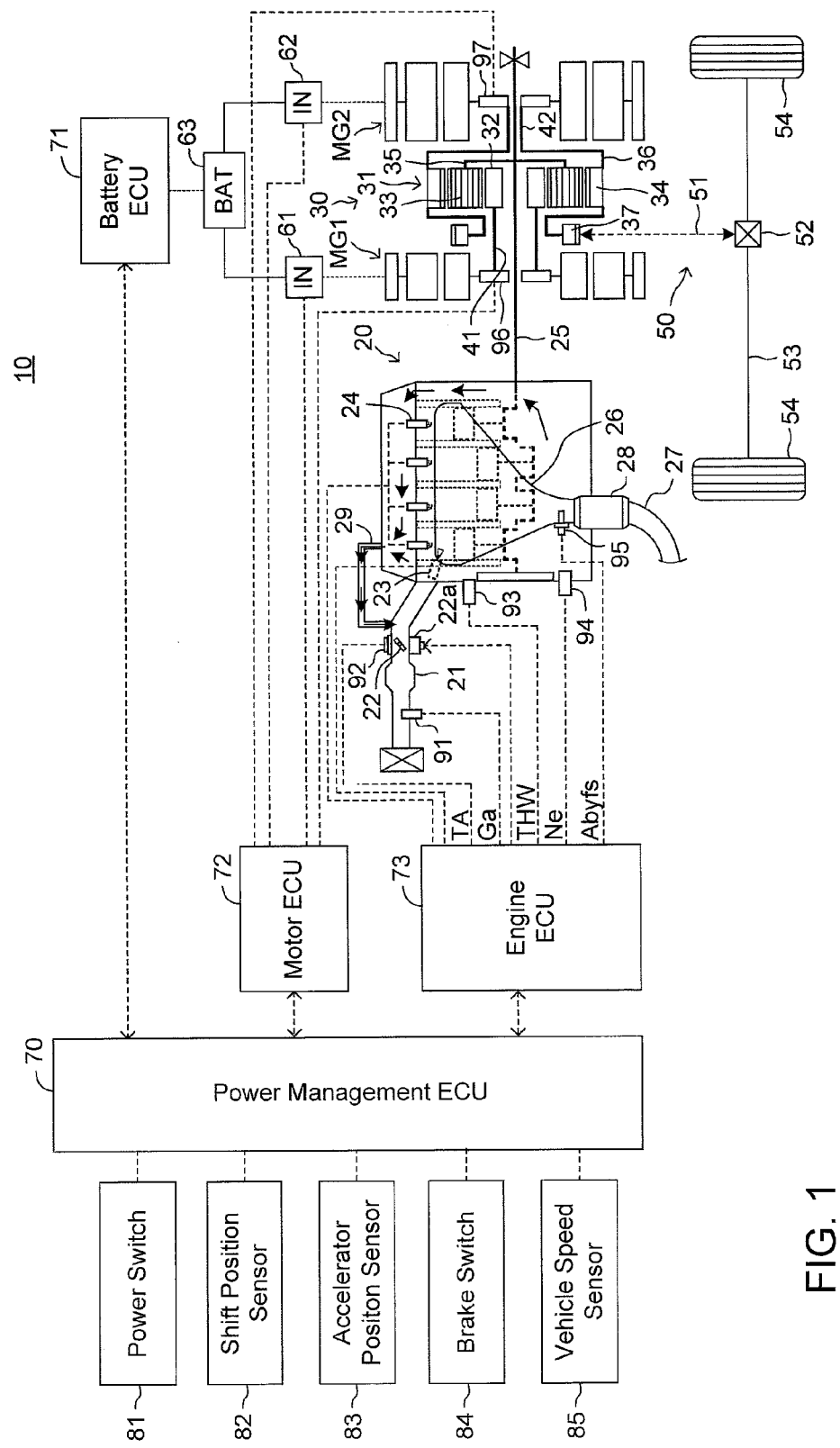
FIG. 1 is a schematic diagram of a hybrid vehicle according to an embodiment of the invention.

Hereinafter, a hybrid vehicle according to an embodiment of the present invention will be described by referring to the drawings.

(Configuration)

The hybrid vehicle 10 according to the embodiment of the invention has, as illustrated in FIG. 1, a motor generator MG1, a motor generator MG2, an internal combustion engine 20, a power distribution mechanism 30, a power transmission mechanism 50, a first inverter 61, a second inverter 62, a battery 63, a power management ECU 70, a battery ECU 71, a motor ECU 72, and an engine ECU 73.

In addition, ECU stands for electric control unit and is an electric control circuit that has, as the main component, a microcomputer including a CPU, a ROM, a RAM, an interface, etc.

The motor generator MG1 is a synchronous motor generator that can work as the both of an electric generator and an electric motor. The motor generator MG1 is referred to as the first motor generator MG1 for the sake of convenience. The first motor generator MG1, in this embodiment, mainly serves as an electric generator. The first motor generator MG1 has a rotary shaft 41 (hereinafter referred to as "first shaft 41").

The motor generator MG2 is a synchronous motor generator that can work as the both of an electric generator and an electric motor, which is the same as the first motor generator MG1. The motor generator MG2 is referred to as the second motor generator MG2 for the sake of convenience. The second motor generator MG2, in this embodiment, mainly serves as an electric motor. The second motor generator MG2 has a rotary shaft 42 (hereinafter referred to as "second shaft 42").

The engine 20 is a four-cycle, spark-ignited, in-cylinder fuel injection type, and multicylinder internal combustion engine. The engine 20 has an intake passage part 21 including an intake pipe and an intake manifold, a throttle valve 22, a throttle valve actuator 22a, a plurality of fuel injection valves 23, a plurality of ignition devices 24 including ignition plugs, a crankshaft 25 which is the output shaft of the engine 20, an exhaust manifold 26, an exhaust pipe 27, an three-way catalyst 28, and a PCV system 29. In addition, the engine 20 may have a variable valve timing control device (VVT), which is not shown.

The throttle valve 22 is rotatably supported on the intake passage part 21.

The throttle valve actuator 22a is configured to rotate the throttle valve 22 depending on an instruction signal from the engine ECU 73 so as to change the cross-sectional area of the intake passage part 21.

Each of the fuel injection valves 23, which corresponds to each cylinder, is installed at each intake port of the cylinders and configured to change the fuel injection amount depending on instruction signals from the engine ECU 73.

Figure 2:
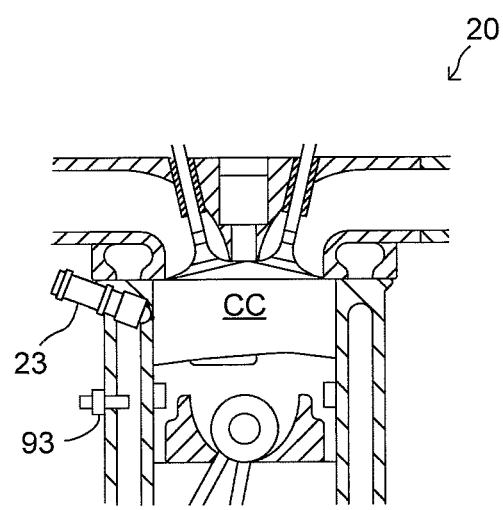
FIG. 2 is a partial cross-sectional diagram of a specific cylinder of the engine of FIG. 1.

Each of the fuel injection valves 23 (Note that single fuel injection valve 23 is illustrated in FIG. 1) is configured to inject fuel directly into each combustion chamber of the cylinders depending on instruction signals to inject fuel. In other words, the fuel injection valve 23 is installed so that the discharge hole thereof is exposed to the inside of the combustion chamber CC, as shown in FIG. 2. The fuel injection valve 23 is referred to as "in-cylinder injection valve" or "in-cylinder fuel injection valve".

Each of ignition devices 24, including spark plugs, is configured to generate ignition sparks in the combustion chamber of each cylinder at specific timings, depending on instruction signals from the engine ECU 73.

The three-way catalyst 28 located at an upstream side is a catalyst to clean up exhaust gas and installed at a portion of the exhaust manifold 26 to which portion the exhaust gas is to be collected. In other words, the catalyst 28 is installed at the exhaust passage of the engine 20. The catalyst 28 can remove unburned combustible contents (such as HC and CO) and NOx from exhaust gas discharged from the engine 20.

The PCV system 29 (Positive Crankcase Ventilation system) allows connection between the crankcase, the cylinder head and "a downstream area of the throttle valve 22 in the intake passage part 21 of the engine 20". The PCV system 29 enables gas in the crankcase and the cylinder head (blow-by gas) to recirculate toward each combustion chamber of the cylinders through the intake passage part 21. Thus, if fuel mixed in the lubrication oil of the engine 20 is evaporated to be gas, then the evaporated fuel returns to the combustion chamber.

The engine 20 can change torque and engine rotation speed of the engine 20 (that is, engine power) by controlling parameters such as the fuel injection amount and intake air amount, which air amount can be controlled by changing the valve position of the throttle valve 22 by using the throttle valve actuator 22a. Furthermore, the engine 20 can increase the temperature of exhaust gas discharged from the engine 20 by setting ignition timings at more retarded timings than predetermined reference ignition timings. Thereby, the engine 20 can accelerate warm-up of the catalyst 28.

The power distribution mechanism 30 has a well-known planetary gear mechanism 31. The planetary gear mechanism 31 has a sun gear 32, a plurality of planetary gears 33 and a ring gear 34.

The sun gear 32 is connected to the first shaft 41 of the first motor generator MG1. Hence, the first motor generator MG1 can output torque to the sun gear 32. To the contrary, the first motor generator MG1 can be rotationally-driven by torque input from the sun gear 32 to the first motor generator MG1 (i.e., the first shaft 41). The first motor generator MG1 can generate electricity when being rotationally-driven by torque input from the sun gear 32 to the first motor generator MG1.

Each of the planetary gears 33 engages with the sun gear 32 and also engages with the ring gear 34. The rotary shaft (rotation axis) of the planetary gear 33 is fixed on a planetary carrier 35. The planetary carrier 35 is supported in the mechanism so as to be coaxially rotatable with the sun gear 32. As a result, the rotating planetary gears 33 can revolve on the outer periphery of the sun gear 32. The planetary carrier 35 is connected to the crankshaft 25 of the engine 20. As a result, the planetary gears 33 can be rotationally-driven by torque input from the crankshaft 25 to the planetary carrier 35.

The ring gear 34 is supported in the mechanism so as to be coaxially rotatable with the sun gear 32.

As described above, the planetary gear 33 engages with the sun gear 32 and the ring gear 34. As a result, when the planetary gears 33 input torque to the sun gear 32, the sun gear 32 is rotationally-driven by the torque. When the planetary gears 33 input torque to the ring gear 34, the ring gear 34 is rotationally-driven by the torque. To the contrary, when the sun gear 32 inputs torque to the planetary gears 33, the planetary gears 33 are rotationally-driven by the torque. When the ring gear 34 inputs torque to the planetary gears 33, the planetary gears 33 are rotationally-driven by the torque.

The ring gear 34 is connected to the second shaft 42 of the second motor generator MG2 via a ring gear carrier 36. Hence, the second motor generator MG2 can output torque to the ring gear 34. To the contrary, the second motor generator MG2 can be rotationally-driven by torque input from the ring gear 34 to the second motor generator MG2 (i.e., the second shaft 42). The second motor generator MG2 can generate electricity when being rotationally-driven by torque input from the ring gear 34 to the second motor generator MG2.

Additionally, the ring gear 34 is connected to the output gear 37 via the ring gear carrier 36. As a result, the output gear 37 can be rotationally-driven by torque input from the ring gear 34 to the output gear 37. To the contrary, the ring gear 34 can be rotationally-driven by torque input from the output gear 37 to the ring gear 34.

The power distribution mechanism 30 has the gear train 51, the differential gear 52 and the drive shaft 53.

The gear train 51 connects the output gear 37 and the differential gear 52 with gear mechanism to allow power transmission therebetween. The differential gear 52 is installed on the drive shaft 53. The drive wheels 54 are installed at the both ends of the drive shaft 53. As a result, the torque from the output gear 37 is transmitted to the drive wheels 54 via the gear train 51, the differential gear 52 and the drive shaft 53. The hybrid vehicle 10 can run by using this torque transmitted to the drive shaft 53.

The first inverter 61 is electrically-connected to the first motor generator MG1 and the battery 63. As a result, when the first motor generator MG1 is generating electric power, the electric power generated by the first motor generator MG1 is supplied to the battery 63 via the first inverter 61. To the contrary, the first motor generator MG1 is rotationally-driven by using the electric power supplied from the battery 63 via the first inverter 61.

The second inverter 62 is electrically-connected to the second motor generator MG2 and the battery 63. As a result, the second motor generator MG2 is rotationally-driven by using the electric power supplied from the battery 63 via the second inverter 62. To the contrary, when the second motor generator MG2 is generating electric power, the electric power generated by the second motor generator MG2 is supplied to the battery 63 via the second inverter 62.

In addition, the electric power generated by the first motor generator MG1 can be directly supplied to the second motor generator MG2, and the electric power generated by the second motor generator MG2 can be directly supplied to the first motor generator MG1.

The battery 63, in this embodiment, is a lithium-ion battery. However, the battery 63 may be a chargeable/dischargeable electricity storage system, and nickel-hydrogen batteries or other secondary batteries may be used as the battery 63.

The power management ECU 70 (hereinafter referred to as "PMECU 70") is connected to the battery ECU 71, the motor ECU 72 and the engine ECU 73 so as to allow communications to exchange information with them.

The PMECU 70 is connected to a power switch 81, a shift position sensor 82, an accelerator position sensor 83, a brake switch 84 and a vehicle speed sensor 85, and hence receives (i.e., is configured to be input) output signals generated from the sensors.

The power switch 81 is a system start-up switch of the hybrid vehicle 10. The PMECU 70 is configured to start-up the system (i.e., set it to the ready-on state) when the power switch 81 is used under the condition that a vehicle key is inserted into a key slot and a brake pedal is pressed, which components are not illustrated in the figure.

The shift position sensor 82 is configured to generate signals representing a shift position that is selected with a shift lever installed at a location adjacent to the driver's seat in the hybrid vehicle 10 to enable the driver to handle the shift lever, which lever is not illustrated in the figure. The shift positions include P (the parking position), R (the reverse position), N (the neutral position) and D (the drive position).

The accelerator position sensor 83 is configured to generate output signals representing the degree of control of an accelerator pedal (accelerator control amount AP) that is installed to enable the driver to handle the accelerator pedal, which pedal is not illustrated in the figure. The accelerator control amount AP may be indicated as acceleration control amount.

The brake switch 84 is configured to generate output signals representing that the brake pedal is being used when the brake pedal is pressed, which pedal is installed to enable the driver to handle the brake pedal and is not illustrated in the figure.

The vehicle speed sensor 85 is configured to generate output signals representing the speed SPD of the hybrid vehicle 10.

The PMECU 70 receives the remaining battery charge (state of charge) SOC of the battery 63, which value is calculated in the battery ECU 71. The state of charge SOC is a parameter correlated to the remaining battery charge of the battery 63, and thus the SOC is referred to as remaining battery charge parameter. The state of charge SOC is calculated by using well-known methods based on relevant values such as an accumulated value of inflow/outflow current of the battery 63.

The PMECU 70 receives, via the motor ECU 72, signals representing rotational speed of the first motor generator MG1 (hereinafter referred to as "MG1 rotational speed Nm1") and signals representing rotational speed of the second motor generator MG2 (hereinafter referred to as "MG2 rotational speed Nm2")

In addition, the MG1 rotational speed Nm1 is calculated by the motor ECU 72 based on "output values from the resolver 96 that is installed on the first motor generator MG1 and configured to output signals depending on the rotational angle of the rotor of the first motor generator MG1." The MG2 rotational speed Nm2 is similarly calculated by the motor ECU 72 based on "output values from the resolver 97 that is installed on the second motor generator MG2 and configured to output signals depending on the rotational angle of the rotor of the second motor generator MG2."

The PMECU 70 receives a various sort of output signals representing engine status via the engine ECU 73. The output signals representing the engine status include engine rotational speed NE, throttle valve position TA, coolant water temperature THW, and etc.

The motor ECU 72 is connected to the first inverter 61 and the second inverter 62. The motor ECU 72 sends instruction signals to the first inverter 61 and the second inverter 62 based on instructions from the PMECU 70 (i.e., MG1 instruction torque Tm1* and MG2 instruction torque Tm2*, described below). The motor ECU 72 thereby controls the first motor generator MG1 by using the first inverter 61 and also the second motor generator MG2 by using the second inverter 62.

The engine ECU 73 is connected to the throttle valve actuator 22a, the fuel injection valves 23 and the ignition devices 24, which are referred to as engine actuators, and sends instruction signals to the actuators. Furthermore, the engine ECU 73 is connected to sensors such as an air flow meter 91, a throttle valve position sensor 92, a coolant water temperature sensor 93, an engine rotational speed sensor 94 and an air-fuel ratio sensor 95 and receives output signals generated from the sensors.

The air flow meter 91 is configured to measure the amount of air entered into the engine 20 per unit time and outputs signals representing the amount of air (intake air amount Ga).

The throttle valve position sensor 92 is configured to measure the opening degree of the throttle valve 22 (i.e., throttle valve position) and outputs signals representing the measured throttle valve position TA.

The coolant water temperature sensor 93 is configured to measure the temperature of coolant water of the engine 20 and outputs signals representing the measured coolant water temperature THW. The coolant water temperature THW is a parameter strongly-correlated to the temperature of the catalyst 28 and referred to as catalyst temperature parameter.

The engine rotation speed sensor 94 is configured to generate pulse signals with every predetermined angle rotation of the crankshaft 25 in the engine 20. The engine ECU 73 obtains the engine rotational speed Ne based on the pulse signals.

The air-fuel ratio sensor 95 is installed at an upstream location of the exhaust purification catalyst 28, which location is in a portion of the exhaust manifold 26 to which portion the exhaust gas is to be collected. The air-fuel ratio sensor 95 is so-called "limiting current wide-range air-fuel ratio sensor". The air-fuel ratio sensor 95 is configured to measure air-fuel ratio of exhaust gas and output the measured air-fuel ratio of the exhaust gas (measured air-fuel ratio abyfs). In addition, the value of the measured air-fuel ratio abyfs increases with increasing air-fuel ratio of the exhaust gas (i.e., with increasing degree of lean).

The engine ECU 73 sends instruction signals to "the throttle valve actuator 22a, the fuel injection valves 23, the ignition devices 24 (and a variable intake valve control device, which is not shown)" based on the signals received from these sensors and the instructions from the PMECU 70, and thus control the engine 20. In addition, the engine 20 has a cam position sensor, which is not shown in the figure. The engine ECU 73 is configured to obtain the crank angle of the engine 20 with reference to the intake top dead center of a specific cylinder (i.e., the absolute crank angle) based on the signals from the engine rotational speed sensor 94 and the cam position sensor.

(Operation: Drive Control)

Next, operations of the hybrid vehicle 10 will be described. In addition, the following processes are executed by "the CPU of the PMECU 70 and the CPU of the engine ECU 73". The CPU of the PMECU 70 is referred to as "PM" and the CPU of the engine ECU 73 is referred to as "EG", for the sake of convenience.

The hybrid vehicle exerts a specific torque on the drive shaft 53 by "controlling an output torque of the engine 20 and an output torque of the motor (the second motor generator MG2) to maximize efficiency of the engine 20 (in other words, to operate the engine 20 at the optimum operating point, which is described below)", which specific torque is equal to "a torque required on the drive shaft of the vehicle and determined depending on the acceleration control amount by user (user requiring torque)".

The hybrid vehicle actually controls the engine 20, the first motor generator MG1 and the second motor generator MG2 while considering relationships therebetween. This control is described in detail, for example in patent literatures such as JP 2009-126450 A (US 2010/0241297) and JP 09-308012 A (U.S. Pat. No. 6,131,680 filed on Mar. 10, 1997), except that the intermittency allowance temperature is changed based on "the amount of mixed fuel in the lubrication oil" as described below. These literatures are incorporated herein by reference.

Figure 3:
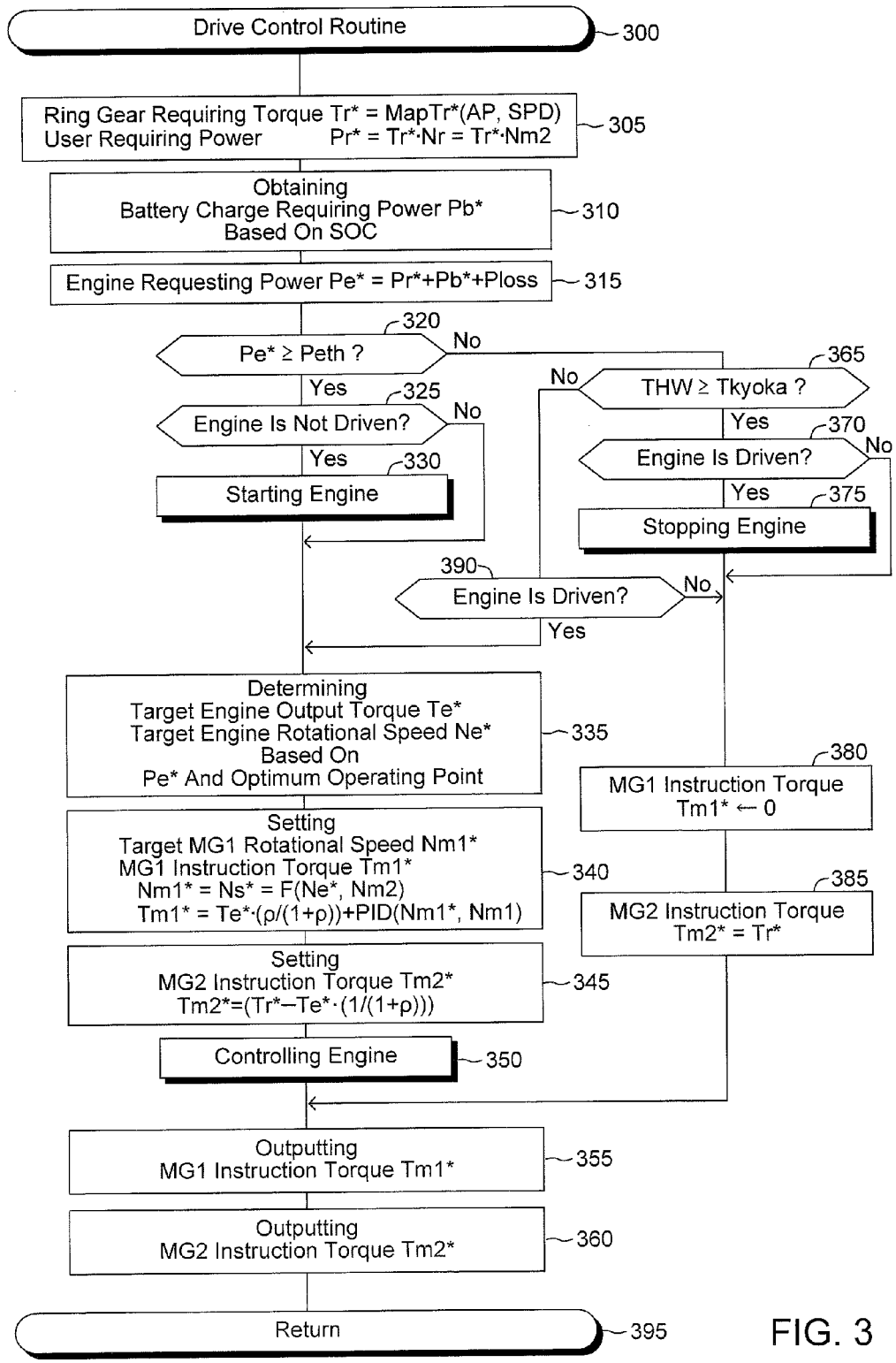
FIG. 3 is a flowchart illustrating a routine executed by a CPU of a power management ECU of FIG. 1.

The PM repeatedly executes the "drive control routine" indicated by a flowchart in FIG. 3 at every predetermined time, when the shift position is the drive position. In particular, the PM starts a process at step 300 in FIG. 3 at a predetermined time, executes the processes in step 305 to step 315 in this order as described below, and proceeds to step 320.

Figure 4:
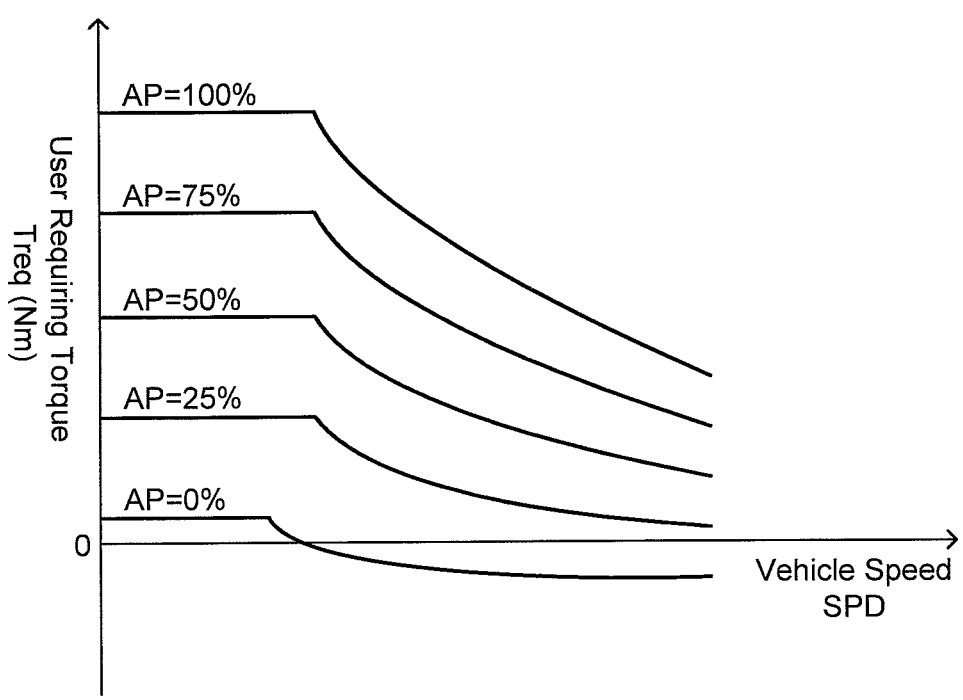
FIG. 4 is a graph illustrating a relationship between accelerator positions, vehicle speed, and required torque by users.

Step 305:

The PM obtains the ring gear requiring torque $Tr^*$ based on the accelerator position AP and the vehicle speed SPD. In particular, the torque acting on the drive shaft 53 (drive shaft torque) is proportional to the torque acting on the rotary shaft of the ring gear 34. Thus, the user requiring torque $Tu^*$, which is the torque required by user to run the hybrid vehicle 10, is proportional to the ring gear requiring torque $Tr^*$. In view of the above, the PM stores the torque map $MapTr^*$(AP, SPD) in the ROM, in the form of a table including data obtained by converting "the relationship between the accelerator position AP, the vehicle speed SPD, and the user requiring torque $Tu^*$" in FIG. 4 to "the relationship between the accelerator position AP, the vehicle speed SPD, and the ring gear requiring torque $Tr^*$". The PM obtains the ring gear requiring torque $Tr^*$ by applying "an accelerator position AP and a vehicle speed SPD" at this moment to the torque map $MapTr^*$(AP, SPD).

Furthermore, the PM obtains, as the user requiring power $Pr^*$, the product of the ring gear requiring torque $Tr^*$ and the MG2 rotational speed Nm2 (that is, $Tr^* \times Nm2$). The output power required on the drive shaft 53 is equal to the product of the user requiring torque $Tu^*$ (i.e., the required drive power on the vehicle) and an actual vehicle speed SPD (that is, $Tu^* \times SPD$). This product ($Tu^* \times SPD$) is equal to the product of the ring gear requiring torque $Tr^*$ and the rotational speed Nr of the ring gear 34 (that is, $Tr^* \times Nr$). In view of the above, the product ($Tr^* \times Nr$) is referred to as "user requiring power $Pr^*$". In this embodiment, the ring gear 34 is connected to the second shaft 42 of the second motor generator MG2 without any intermediate reducer. Thus, the rotational speed Nr of the ring gear 34 is equal to the MG2 rotational speed Nm2. Consequently, the user requiring power $Pr^*$ is equal to the product of the ring gear requiring torque $Tr^*$ and the MG2 rotational speed Nm2 (that is, $Tr^* \times Nm2$).

In addition, in the case that the ring gear 34 is connected to the second shaft 42 of the second motor generator MG2 with intermediate reducing gear, then the rotational speed Nr of the ring gear 34 is equal to a value obtained by dividing the MG2 rotational speed Nm2 by the gear ratio Gr of the reducing gear. Thus, in this case, the user requiring power $Pr^*$ is calculated to be the value ($Tr^* \times Nm2/Gr$).

Step 310:

The PM obtains the battery charge requiring power $Pb^*$ based on the state of charge SOC. The value of the battery charge requiring power $Pb^*$ corresponds to an electrical power that is needed to be supplied to the battery 63 to charge it. The battery charge requiring power $Pb^*$ is calculated to be "zero" when the state of charge SOC is equal to or larger than the predetermined value SOCLoth or "a value that increases with decreasing state of charge SOC" when the state of charge SOC is smaller than the predetermined value SOCLoth.

Step 315:

The PM obtains, as the engine requesting power $Pe^*$, the value calculated by adding the loss Ploss and the sum of the user requiring power $Pr^*$ and the battery charge requiring power $Pb^*$ (that is, $Pr^*+Pb^*+Ploss$). The engine requesting power $Pe^*$ is an output power required on the engine 20.

Next, the PM proceeds to step 320 to determine whether or not the engine requesting power $Pe^*$ is equal to or larger than the threshold requesting power Peth. The threshold requesting power Peth is set to be a certain value where a drive efficiency of the engine (i.e., fuel efficiency) of the engine 20 would be equal to or smaller than an acceptable limit if the output power of the engine 20 is smaller than the threshold requesting power Peth. In other words, the threshold requesting power Peth is set to be a certain value where "a specific efficiency" would be equal to or smaller than the acceptable limit, which specific efficiency is the maximum efficiency of the engine 20 under the condition that an output power of the engine 20 is equal to the threshold requesting power Peth.

(Case 1)

This case is an example when the engine requesting power Pe* is equal to or larger than the threshold requesting power Peth.

In this case, the PM determines as "Yes" at step 320, proceeds to step 325, and then determines whether or not the engine 20 is being stopped (i.e., the engine is not driven) at this moment. When the engine is not driven at this moment, the PM determines as "Yes" at step 325, proceeds to step 330, and then sends an instruction to start the engine (an engine starting instruction) to the EG. The EG starts the engine 20 based on this instruction. After that, the PM proceeds to step 335. On the other hand, when the engine is driven at this moment, the PM determines as "No" at step 325 to proceed to step 335 directly.

The PM executes the processes in step 335 to step 360 in this order. After that, the PM proceeds to step 395 to end this routine once.

Step 335:

The PM drives the engine 20 so that the output power of the engine 20 is equal to the engine requesting power Pe* and the drive efficiency of the engine 20 becomes the maximum value. In other words, the PM determines, based on the optimum operating point corresponding to the engine requesting power Pe*, the target engine output torque Te* and the target engine rotational speed Ne*.

Figure 5:
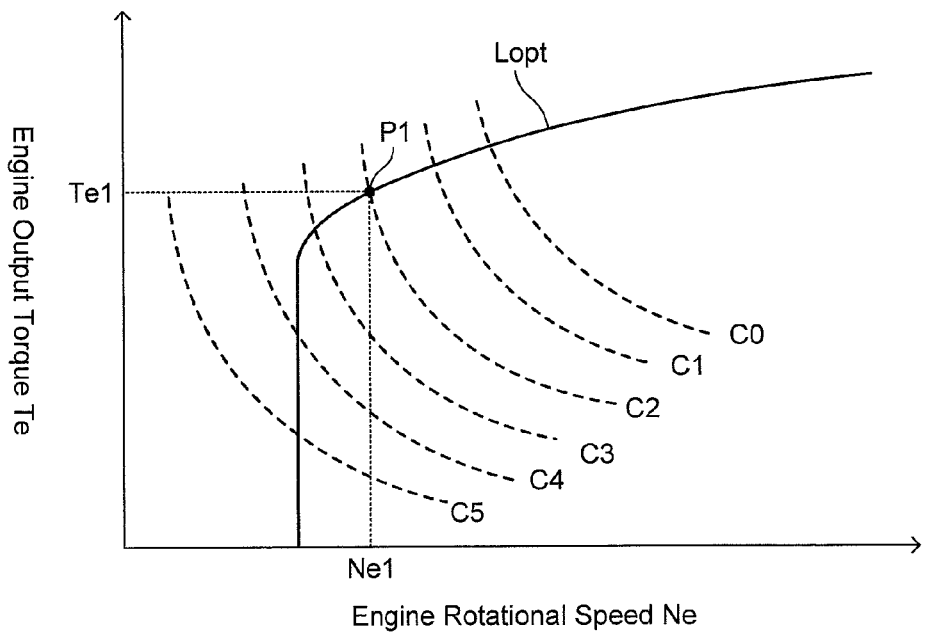
FIG. 5 is a schematic diagram illustrating a relationship between engine rotation speed, engine output torque, and an optimum operation line of the engine.

In particular, a set of the best operating points of the engine 20 for each of specific output powers is defined in advance by means such as experiments, as the optimum operating points, at which operating points the drive efficiencies (fuel efficiencies) of the engine 20 become the best when the crank shaft 25 outputs each of the specific output powers. These optimum operating points are plotted on a graph defined with the engine output torque Te and the engine rotational speed Ne, and then the plotted points are connected to form a specific line as the optimum operating line. In FIG. 5, the optimum operating line defined as above is illustrated with the solid line Lopt. The broken lines C0 to C5 in FIG. 5 represent specific lines (i.e., equal output lines) that are defined by connecting engine operating points at which points the crank shaft 25 can output same output powers.

The PM searches one of the optimum operating points at which the same output power as the engine requesting power Pe* can be obtained, and then determines, as "the target engine output torque Te* and the target engine rotational speed Ne*", the engine output torque Te and the engine rotational speed Ne corresponding to the searched optimum operating point, respectively. For example, when the engine requesting power Pe* is equal to the output power corresponding to the line C2 in FIG. 5, the intersection point P1 of the line C2 and the solid line Lopt is used to determine the target engine output torque Te* and the target engine rotational speed Ne* so that the engine output torque Te1 and the engine rotational speed Net each corresponding to the intersection point P1 are used as the former Te* and the latter Ne*, respectively.

Step 340:

The PM calculates "the target MG1 rotational speed Nm1* equal to the target rotational speed Ns* of the sun gear 32", by using the following formula (1), so that "the MG2 rotational speed Nm2 equal to the rotational speed Nr" is assigned to the rotational speed Nr of the ring gear 34 and the target engine rotational speed Ne* is assigned to the engine rotational speed Ne.

$$Ns=Nr-(Nr-Ne)\times(1+\rho)/\rho \quad (1)$$

Regarding the above formula (1), "$\rho$" represents the value defined by the following formula (2). In particular, "$\rho$" is the ratio of the number of gear teeth of the sun gear 32 to that of the ring gear 34.

$$\rho=\text{(Number of gear teeth of the sun gear 32)/(Number of gear teeth of the ring gear 34)} \quad (2)$$

Figure 6:
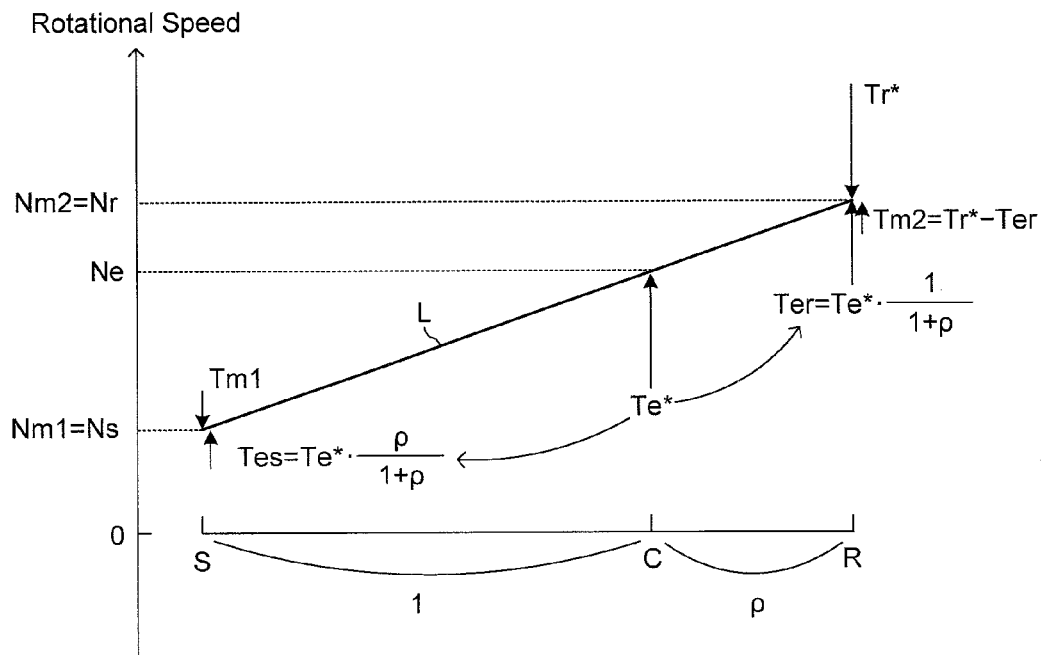
FIG. 6 is an alignment chart of a planetary gear train while the hybrid vehicle is moving.

Here, grounds for the formula (1) will be described below. In FIG. 6, a relationship between rotational speeds of respective gears in the planetary gear mechanism 31 is illustrated by using a known alignment chart. The straight line in the alignment chart is referred to as operational alignment line L. As is understood by the alignment chart, the ratio of the difference between the rotational speed Nr of the ring gear 34 and the rotational speed Ns of the sun gear 32 (Nr−Ns) to the difference between the engine rotational speed Ne and the rotational speed Ns of the sun gear 32 (Ne−Ns), which ratio is (Ne−Ns)/(Nr−Ns), is equal to the ratio of the value (1+$\rho$) to 1 (=1/(1+$\rho$)). The formula (1) is derived from this proportional relationship.

Furthermore, at step 340, the PM calculates the MG1 instruction torque Tm1*, which is a torque to be output from the first motor generator MG1, in accordance with the following formula (3). Regarding the formula (3), the value PID(Nm1*−Nm1) represents a feedback amount based on the difference between "the target MG1 rotational speed Nm1* and an actual rotational speed Nm1 of the first motor generator MG1". In other words, the value PID(Nm1*−Nm1) is a feedback amount to match the actual rotational speed Nm1 with the target MG1 rotational speed Nm1*.

$$Tm1^*=Te^*\times(\rho/(1+\rho))+PID(Nm1^*-Nm1) \quad (3)$$

Here, grounds for the formula (3) will be described below. When the torque generated on the crank shaft 25 is equal to the target engine output torque Te* (i.e., when the engine output torque is Te*), the engine output torque Te* is converted with the planetary gear mechanism 31 to the following torques: the torque Tes acting on the rotary shaft of the sun gear 32 and defined as the following formula (4); and the torque Ter acting on the rotary shaft of the ring gear 34 and defined as the following formula (5).

$$Tes=Te^*\times(\rho/(1+\rho)) \quad (4)$$

$$Ter=Te^*\times(1/(1+\rho)) \quad (5)$$

In order to stabilize the alignment line, forces acting on the alignment line are needed to be equilibrated. Hence, as illustrated in FIG. 6, the torque Tm1 is needed to be acted at the rotary shaft of the sun gear 32 so that the torque is same in amplitude and opposite in direction to the torque Tes calculated with the formula (4), and the torque Tm2 calculated with the following formula (6) is needed to be acted at the rotary shaft of the ring gear 34. In other words, the torque Tm2 is equal to the shortage of the torque Ter for the ring gear requiring torque Tr*. This torque Tm2 is employed as the MG2 instruction torque Tm2*.

$$Tm2=Tr^*-Ter \quad (6)$$

On the other hand, when the sun gear 32 rotates at the target rotational speed Ns* (i.e., when an actual rotational speed Nm1 of the first motor generator MG1 is equal to the target MG1 rotational speed Nm1*), the engine rotational speed Ne is equal to the target engine rotational speed Ne*. In view of the above, the MG1 instruction torque Tm1* is calculated with the formula (3).

Step 345:

The PM calculates the MG2 instruction torque Tm2* in accordance with the formula (5) and the formula (6), which torque is a torque to be output from the second motor generator MG2. In addition, the PM may determine the MG2 instruction torque Tm2* based on the following formula (7).

$$Tm2^* = Tr^* - Tm1^*/\rho \qquad (7)$$

Step 350:

The PM sends instruction signals to the EG to operate the engine 20 at the optimum operating point (i.e., to match the engine output torque with the target engine output torque Te*). Then, the EG changes the opening degree of the throttle valve 22 by rotating the throttle valve actuator 22a, changes the fuel injection amount depending thereon, and controls the engine 20 to match the engine output torque Te with the target engine output torque Te*.

Step 355:

The PM sends the MG1 instruction torque Tm1* to the motor ECU 72. The motor ECU 72 controls the first inverter 61 to match the output torque of the first motor generator MG1 with the MG1 instruction torque Tm1*.

Step 360:

The PM sends the MG2 instruction torque Tm2* to the motor ECU 72. The motor ECU 72 controls the second inverter 62 to match the output torque of the second motor generator MG2 with the MG2 instruction torque Tm2*.

Due to the above processes, a torque equal to the ring gear requiring torque Tr* is acted on the ring gear 34 by using the engine 20 and the second motor generator MG2. Furthermore, when the state of charge SOC is smaller than the predetermined value SOCLoth, the engine 20 is controlled to increase output power by the battery charge requiring power Pb*. Thus, the torque Ter increases and then the MG2 instruction torque Tm2* decreases, as is understood by the formula (6). As a result, the above processes decrease the amount of electrical power consumed by the second motor generator MG2 out of the total electrical power generated with the first motor generator MG1, and then the battery 63 is charged by using the surplus electrical power generate with the first motor generator MG1 (i.e., an electrical power that is not consumed by the second motor generator MG2).

(Case 2)

This case is an example when the engine requesting power Pe* is smaller than the threshold requesting power Peth and the coolant water temperature THW is equal to or higher than the intermittency allowance temperature Tkyoka.

In this case, the PM determines as "No" at step 320, proceeds to step 365, and then determines whether or not the coolant water temperature THW is higher than the intermittency allowance temperature Tkyoka at this moment. The intermittency allowance temperature Tkyoka is changed by the EG based on a magnitude relationship between the mixed fuel amount Sk and the threshold mixed fuel amount Skth described below, and the temperature Tkyoka is sent to the PM by using communications.

In this case, the coolant water temperature THW is higher than the intermittency allowance temperature Tkyoka, then the PM as "Yes" at step 365, proceeds to step 370, and determines whether or not the engine 20 is being driven at this moment. When the engine is driven at this moment, the PM determines as "Yes" at step 370, proceeds to step 375, and then sends an instruction to stop the engine to the EG. The EG stops the engine 20 by setting the fuel injection amount to "zero" based on this instruction (i.e., by stopping fuel injection). After that, the PM proceeds to step 380. On the other hand, when the engine is stopped at this moment, the PM determines as "No" at step 370 to proceed to step 380 directly.

Next, the PM proceeds to step 380 to set the MG1 instruction torque Tm1* as "zero", and proceeds to step 385 to set the MG2 instruction torque Tm2* as the ring gear requiring torque Tr*. After that, the PM executes the processes in step 355 and step 360 as described above. As a result, the user requiring torque Tu* is satisfied only by using torque generated with the second motor generator MG2.

(Case 3)

This case is an example when the engine requesting power Pe* is smaller than the threshold requesting power Peth and the coolant water temperature THW is lower than the intermittency allowance temperature Tkyoka.

In this case, when the PM proceeds to step 320, the PM determines as "No" at step 320, proceeds to step 365, and then determines as "No" at step 365. The PM proceeds to step 390 to determine "whether or not the engine 20 is being driven" at this moment. When the engine is driven at this moment, the PM determines as "Yes" at step 390 to execute the processes in the step 335 to step 360. On the other hand, when the engine is stopped at this moment, the PM determines as "No" at step 390 to execute processes in step 380, step 385, step 355 and step 360.

As described above, when the coolant water temperature THW is lower than the intermittency allowance temperature Tkyoka and the engine 20 is driven, the engine 20 is not stopped even if the engine requesting power Pe* is smaller than the threshold requesting power Peth. In other words, the engine 20 is started to be driven when the engine requesting power Pe* is equal to or larger than the threshold requesting power Peth, and after that, the engine 20 is continued to be driven even if the engine requesting power Pe* falls below the threshold requesting power Peth as far as the coolant water temperature THW is lower than the intermittency allowance temperature Tkyoka. Consequently, the number of starting of the engine 20 decreases.

To the contrary, when the coolant water temperature THW is higher than the intermittency allowance temperature Tkyoka and the engine requesting power Pe* falls below the threshold requesting power Peth, the engine 20 is stopped if the engine 20 is driven. Furthermore, when the coolant water temperature THW is higher than the intermittency allowance temperature Tkyoka and the engine requesting power Pe* rises above the threshold requesting power Peth, the engine 20 is started if the engine 20 is not driven. Consequently, the number of starting of the engine 20 increases.

(Operation: Estimation of Mixed Fuel Amount)

Next, operations for estimating the mixed fuel amount, which is the amount of fuel mixed in lubrication oil (engine oil) of the engine 20, will be described below. These operations are executed by the EG.

Figure 7:
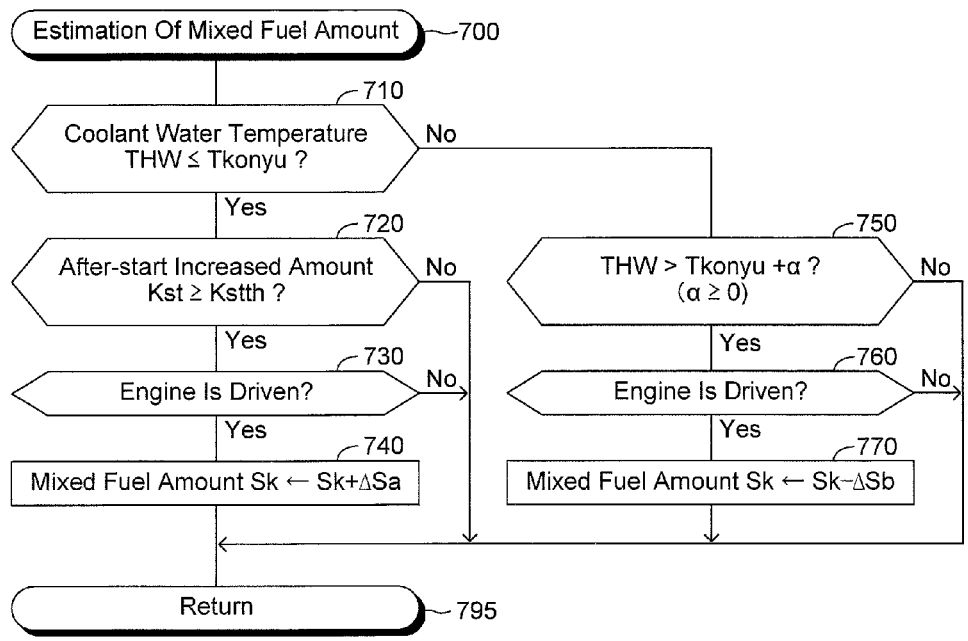
FIG. 7 is a flowchart illustrating a routine executed by the CPU of the power management ECU of FIG. 1.

The EG repeatedly executes the "estimation of mixed fuel amount" routine indicated by a flowchart in FIG. 7 at every predetermined time. In particular, the EG starts a process at step 700 in FIG. 7 at a predetermined time, proceeds to step 710, and then determines whether or not the coolant water temperature THW is equal to or smaller than the first threshold coolant water temperature Tkonyu. The first threshold coolant water temperature Tkonyu is set to be a certain value where it is highly possible that fuel mixes into the lubrication oil of the engine 20, which fuel is due to adherence of large amounts of fuel on the inner wall of the combustion chamber when directly injecting fuel into the combustion chamber (i.e., into the cylinder) under the condition that the coolant water temperature THW is equal to or lower than the first threshold coolant water temperature Tkonyu.

When the coolant water temperature THW is equal to or lower than the first threshold coolant water temperature Tkonyu, the EG determines as "Yes" at step 710, proceeds to step 720, and determines whether or not the after-start increased amount Kst is equal to or larger than the threshold increased amount Kstth. When the after-start increased amount Kst is equal to or larger than the threshold increased amount Kstth, the EG determines as "Yes" at step 720 to proceed to step 730, and then determines whether or not the engine 20 is driven at this moment.

When the engine 20 is driven, the EG determines as "Yes" at step 730 to proceed to step 740, then calculates and estimates new mixed fuel amount Sk by adding the predetermined positive value $\Delta Sa$ to the mixed fuel amount Sk stored at that moment (previous time value of the mixed fuel amount Sk). After that, the EG proceeds to step 795 to end this routine once.

In addition, when the after-start increased amount Kst is smaller than the threshold increased amount Kstth, the EG determines as "No" at step 720, and then directly proceeds to step 795 to end this routine once. Furthermore, when the engine 20 is not driven (i.e., when the engine 20 is being stopped), the EG determines as "No" at step 730, and then directly proceed to step 795 to end this routine once.

On the other hand, when the coolant water temperature THW is higher than the first threshold coolant water temperature Tkonyu, the EG determines as "No" at step 710, proceeds to step 750, and determines whether or not the coolant water temperature THW is higher than the second threshold coolant water temperature (Tkonyu+$\alpha$). The value $\alpha$ is a predetermined value equal to or larger than "zero". Hence, the second threshold coolant water temperature (Tkonyu+$\alpha$) is higher than the first threshold coolant water temperature Tkonyu. The second threshold coolant water temperature (Tkonyu+$\alpha$) is set to be a certain value where it is highly unlikely that fuel mixes into the lubrication oil due to adherence of large amounts of fuel on the inner wall of the combustion chamber when directly injecting fuel into the combustion chamber under the condition that the coolant water temperature THW is higher than the second threshold coolant water temperature (Tkonyu+$\alpha$), and where the mixed fuel amount decreases since fuel mixed in the lubrication oil is evaporated in the oil pan and the crank case and then the evaporated fuel is supplied to the combustion chamber of the engine 20 through the PCV system 29.

When the coolant water temperature THW is lower than the second threshold coolant water temperature (Tkonyu+$\alpha$), the EG determines as "No" at step 750, then proceed to step 795 to end this routine once. To the contrary, When the coolant water temperature THW is higher than the second threshold coolant water temperature (Tkonyu+$\alpha$), the EG determines as "Yes" at step 750, then proceeds to step 760 to determine whether or not the engine 20 is driven at this moment.

After that, when the engine 20 is driven at this moment, the EG determines as "Yes" at step 760, proceeds to step 770, and then calculates and estimates new mixed fuel amount Sk by subtracting the predetermined positive value $\Delta Sb$ from the mixed fuel amount Sk stored at that moment (previous time value of the mixed fuel amount Sk). After that, the EG proceeds to step 795 to end this routine once. When the engine 20 is not driven at this moment, the EG determines as "No" at step 760, then proceeds to step 795 to end this routine once.

As described above, the mixed fuel amount Sk repeatedly increases by the predetermined amount $\Delta Sa$ at every predetermined time when the following conditions are satisfied: the coolant water temperature THW is equal to or lower than the first threshold coolant water temperature Tkonyu; the after-start increased amount Kst is equal to or larger than the threshold increased amount Kstth; and the engine 20 is driven. To the contrary, the mixed fuel amount Sk repeatedly decreases by the predetermined amount $\Delta Sb$ at every predetermined time when the following conditions are satisfied: the coolant water temperature THW is higher than the second threshold coolant water temperature (Tkonyu+$\alpha$); and the engine 20 is driven.

(Operation: Setting of Intermittency Allowance Temperature)

Next, operations for changing/setting the intermittency allowance temperature Tkyoka will be described below. These operations are executed by the EG.

Figure 8:
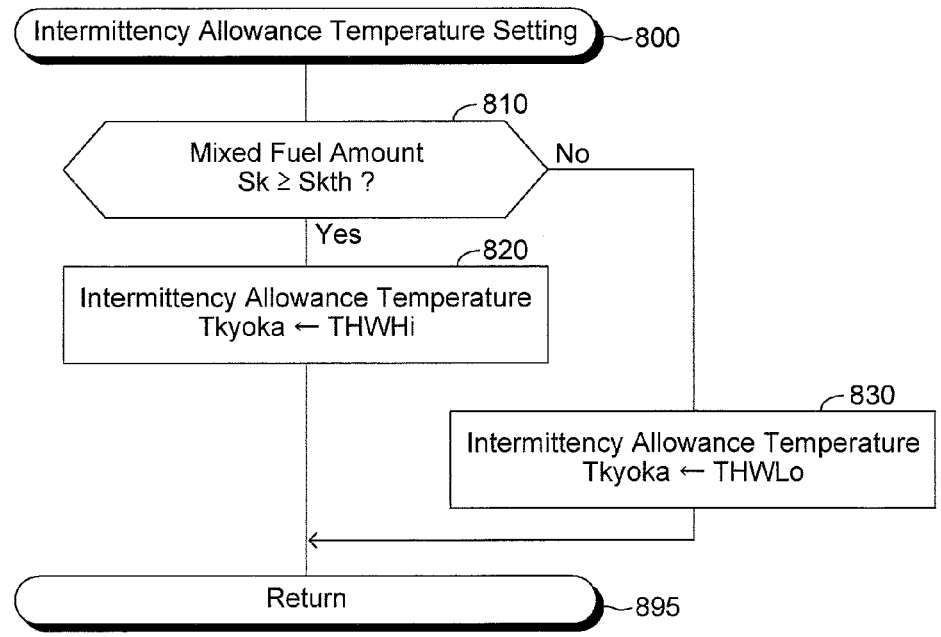
FIG. 8 is a flowchart illustrating a routine executed by the CPU of the power management ECU of FIG. 1.

The EG repeatedly executes the "setting of intermittency allowance temperature" routine indicated by a flowchart in FIG. 8 at every predetermined time. In particular, the EG starts a process at step 800 in FIG. 8 at a predetermined time, proceeds to step 810, and then determines whether or not the mixed fuel amount Sk is equal to or larger than the threshold mixed fuel amount Skth.

When the mixed fuel amount Sk is equal to or larger than the threshold mixed fuel amount Skth, the EG determines as "Yes" at step 810, proceeds to step 820, and sets the "high threshold temperature (i.e., first threshold temperature) THWHi" as the intermittency allowance temperature Tkyoka. An example of the high threshold temperature THWHi is 85° C. After that, the EG proceeds to step 895 to end this routine once.

On the other hand, when the mixed fuel amount Sk is smaller than the threshold mixed fuel amount Skth, the EG determines as "No" at step 810, proceeds to step 830, and sets the "low threshold temperature (i.e., second threshold temperature) THWLo" as the intermittency allowance temperature Tkyoka. The low threshold temperature THWLo is lower than the high threshold temperature THWHi, and an example thereof is 40° C. After that, the EG proceeds to step 895 to end this routine once.

As described above, the intermittency allowance temperature Tkyoka is set to be the high threshold temperature THWHi when the mixed fuel amount Sk is equal to or larger than the threshold mixed fuel amount Skth, or the low threshold temperature THWLo when the mixed fuel amount Sk is smaller than the threshold mixed fuel amount Skth.

(Operation: Fuel Injection Amount Control of Engine)

Next, a brief explanation of fuel injection amount control will be described below. The EG repeatedly executes the "setting of initial value of after-start increased amount" routine indicated by a flowchart in FIG. 9 at every predetermined time.

Figure 9:
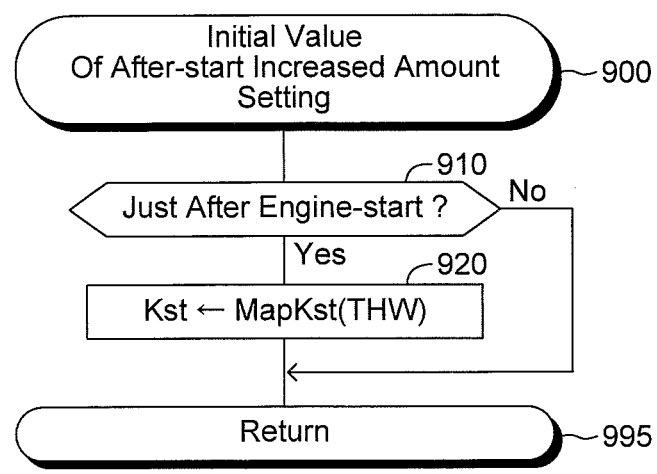
FIG. 9 is a flowchart illustrating a routine executed by the CPU of the power management ECU of FIG. 1.

In particular, the EG starts a process at step 900 in FIG. 9 at a predetermined time, proceeds to step 910, and then determines whether or not the present time is just after the engine-start based on the instructions from the PM. When the present time is just after the engine-start based on the instructions from the PM, the EG determines as "Yes" at step 910, proceeds to step 920, and determines the after-start increased amount Kst (the initial value of the after-start increased amount Kst) based on the coolant water temperature THW. In this case, the after-start increased amount Kst is calculated to increase with decreasing temperature of the coolant water temperature THW. In this regard, however, the after-start increased amount Kst is determined to be "zero", when the coolant water temperature THW is equal to or higher than the specific temperature THWth (for example, 85° C.) to which the coolant water temperature reaches when the engine is completely warmed-up. After that, the EG proceeds to step 995 to end this routine once.

To the contrary, when the present time is not just after the engine-start based on the instructions from the PM, the EG determines as "No" at step 910, proceeds to step 995 to end this routine once.

Figure 10:
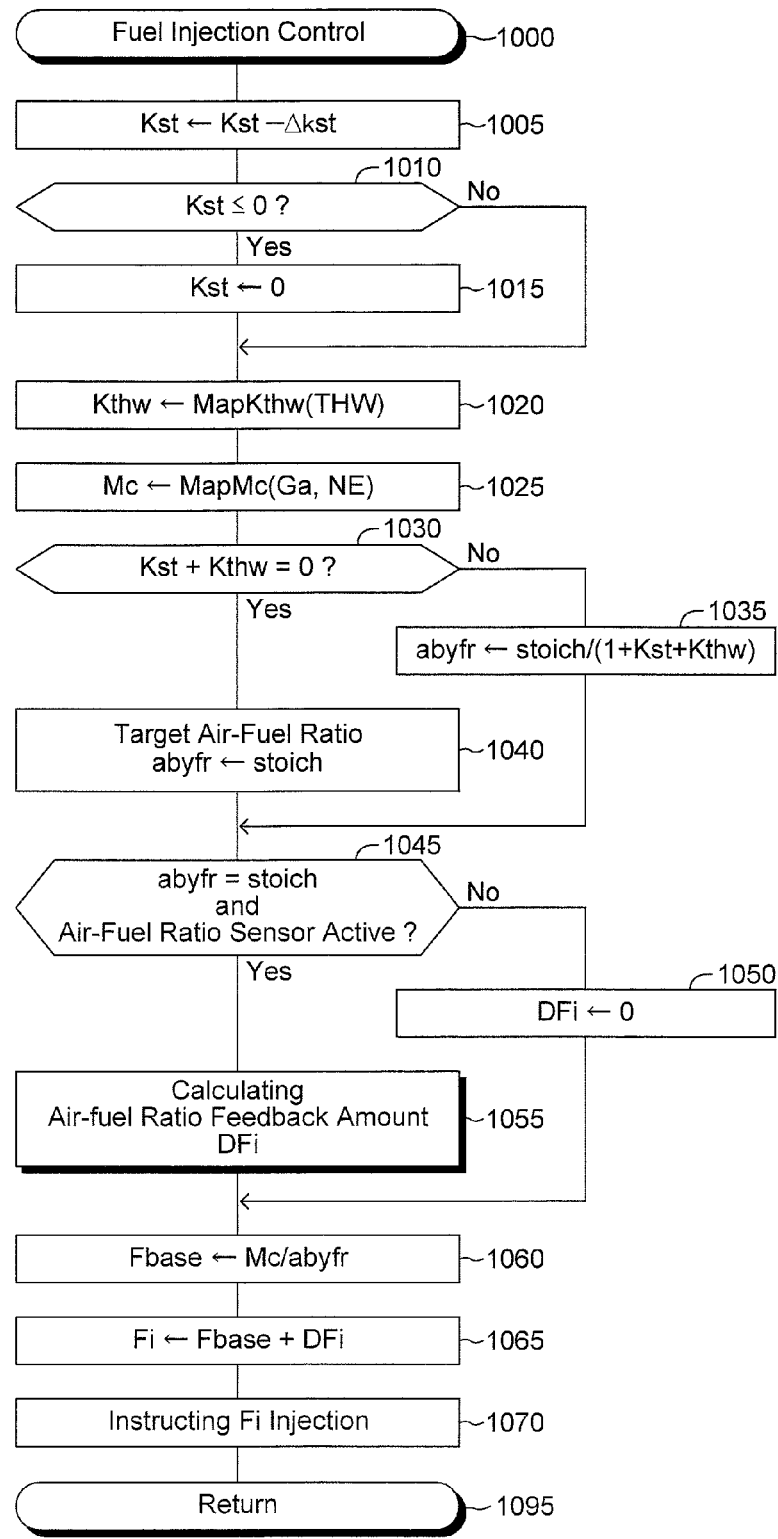
FIG. 10 is a flowchart illustrating a routine executed by the CPU of the power management ECU of FIG. 1.

Furthermore, the EG repeatedly executes the "control of fuel injection amount" routine indicated by a flowchart in FIG. 10 at every predetermined time. In particular, the EG starts a process at step 1000 in FIG. 10 at a predetermined time, proceeds to step 1005, and then sets, as the new after-start increased amount Kst, a value obtained by subtracting Δkst from the after-start increased amount Kst. Thus, the after-start increased amount Kst gradually decreases.

Next, the EG proceeds to step 1010 to determine whether or not the after-start increased amount Kst is equal to or smaller than "zero". When the after-start increased amount Kst is equal to or smaller than "zero", the EG determines as "Yes" at step 1010, proceeds to step 1015 to set "zero" as the after-start increased amount Kst, and then proceed to step 1020. To the contrary, when the after-start increased amount Kst is larger than "zero", the EG determines as "No" at step 1010, proceeds to step 1020 directly. As described above, the after-start increased amount Kst is set to be a value equal to or larger than "zero".

At step 1020, the EG determines the warm-up increased amount Kthw based on "the coolant water temperature THW at this moment". In this case, the warm-up increased amount Kthw is calculated to increase with decreasing temperature of the coolant water temperature THW. In this regard, however, the warm-up increased amount Kthw is determined to be "zero", when the coolant water temperature THW is equal to or higher than the specific temperature THWth (for example, 85° C.) to which the coolant water temperature reaches when the engine is completely warmed-up.

Next, the EG obtains the amount of air (i.e., in-cylinder intake air amount) Mc guided into a cylinder during a intake stroke, which cylinder next has a turn of the intake stroke, based on the intake air amount Ga and the engine rotational speed Ne of the engine 20, by using the table MapMc(Ga, Ne)

Next, the EG proceeds to step 1030 to determine whether or not the sum of the after-start increased amount Kst and the warm-up increased amount Kthw (hereinafter referred to as "total increased amount") is "zero". When the total increased amount (Kst+Kthw) is not "zero", the EG determines as "No" at step 1030, proceeds to step 1035, and then sets the target air-fuel ratio abyfr in accordance with the following formula (8). Regarding the formula (8), the constant stoich represent the theoretical air-fuel ratio (for example, 14.6). As a result, the target air-fuel ratio abyfr is set to be a rich air-fuel ratio, which is smaller than the theoretical air-fuel ratio stoich.

$$\text{Target air-fuel ratio } abyfr = \text{stoich}/(1 + Kst + Kthw) \quad (8)$$

To the contrary, when the total increased amount (Kst+Kthw) is "zero", the EG determines as "Yes" at step 1030, proceeds to step 1040, and then sets the theoretical air-fuel ratio stoich as the target air-fuel ratio abyfr.

Next, the EG proceeds to step 1045 to determine whether or not the target air-fuel ratio abyfr is set to the theoretical air-fuel ratio stoich and the air-fuel ratio sensor 95 is activated, by using known methods.

When the target air-fuel ratio abyfr is different from the theoretical air-fuel ratio stoich or the air-fuel ratio sensor 95 is not activated, the EG determines as "No" at step 1045, proceeds to step 1050 to set the air-fuel ratio feedback amount DFi to be "zero", and proceeds to step 1060 or later.

To the contrary, when the target air-fuel ratio abyfr is set to be the theoretical air-fuel ratio stoich and the air-fuel ratio sensor 95 is activated, the EG determines as "Yes" at step 1045, proceeds to step 1055 to calculate the air-fuel ratio feedback amount DFi in accordance with known methods (for example, PI control). The air-fuel ratio feedback amount DFi is the feedback amount to match "an actual air-fuel ratio (detected air-fuel ratio) abyfs detected with the air-fuel ratio sensor 95" with "the theoretical air-fuel ratio stoich, which is the target air-fuel ratio abyfr". In brief, the air-fuel ratio feedback amount DFi is decreased when the detected air-fuel ratio abyfs is smaller than the theoretical air-fuel ratio stoich (that is, the air-fuel ratio is rich), and the amount DFi is increased when the detected air-fuel ratio abyfs is larger than the theoretical air-fuel ratio stoich (that is, the air-fuel ratio is lean).

Next, the EG executes the processes in step 1060 to step 1070 in this order, and then proceeds to step 1095 to end this routine once.

Step 1060:
The EG calculates the base fuel injection amount Fbase by dividing the in-cylinder intake air amount Mc with the target air-fuel ratio abyfr. Hence, when the target air-fuel ratio abyfr is the rich air-fuel ratio, which is calculated at step 1035, the base fuel injection amount Fbase becomes larger than "the base fuel injection amount Fbase corresponding to the theoretical air-fuel ratio stoich".

Step 1065:
The EG calculates the final fuel injection amount Fi by adding the air-fuel ratio feedback amount DFi to the base fuel injection amount Fbase.

Step 1070:
The EG sends an instruction signal to the fuel injection valves 23 installed on a cylinder that next has a turn of the intake stroke (fuel injection cylinder), which signal is to inject fuel of the final fuel injection amount Fi into the fuel injection cylinder. Thereby, the fuel injection valves 23 installed on the fuel injection cylinder injects fuel of the final fuel injection amount Fi, at a time before the top dead center by a predetermined crank angle.

As described above, the mixed fuel amount Sk is estimated, and the intermittency allowance temperature Tkyoka is set to rise with increasing amount of the mixed fuel amount Sk, in this embodiment. In particular, the intermittency allowance temperature Tkyoka is changed from the low threshold temperature THWLo to the high threshold temperature THWHi in the case that the mixed fuel amount Sk is equal to or larger than the threshold mixed fuel amount Skth. In other words, the intermittency allowance temperature Tkyoka is set to be the low threshold temperature THWLo when the mixed fuel amount Sk is smaller than the threshold mixed fuel amount Skth, and the temperature Tkyoka is set to be the high threshold temperature THWHi when the mixed fuel amount Sk is equal to or larger than the threshold mixed fuel amount Skth.

First Modified Embodiment

Next, first modified embodiment of the hybrid vehicle according to the above embodiment will be described below. The first modified embodiment is different from the above embodiment only in that the EG executes the "setting of intermittency allowance temperature" routine indicated by the flowchart in FIG. 11 in place of that in FIG. 8. Hence, the following descriptions will be mainly concerned this difference.

Figure 11:
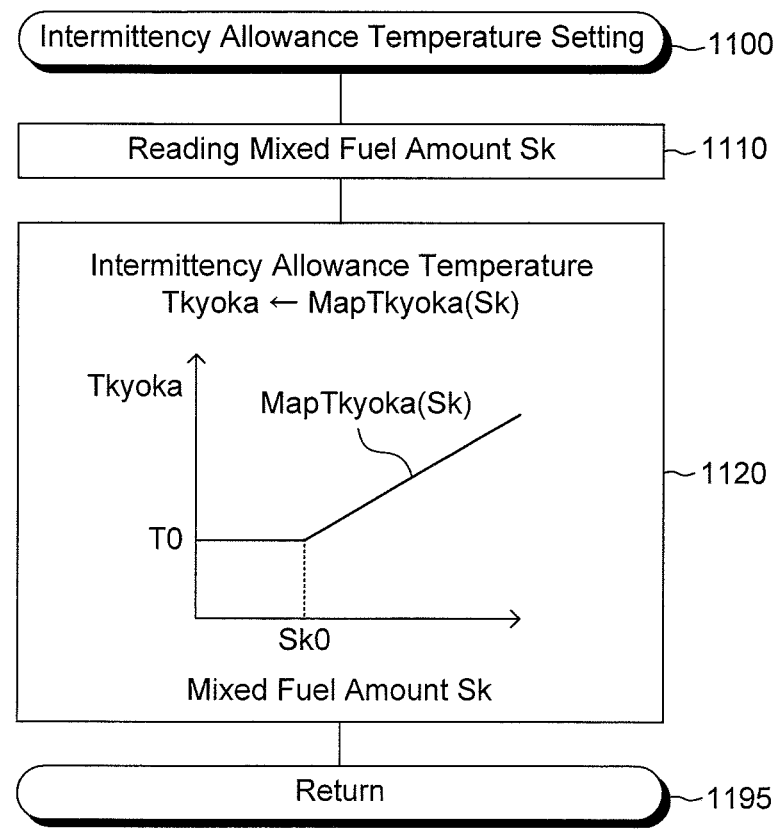
FIG. 11 is a flowchart illustrating a routine executed by a CPU of a power management ECU of a hybrid vehicle according to first modified example of the embodiment of the invention.

The EG starts a process at step 1100 in FIG. 11 at a predetermined time, proceeds to step 1110, and then reads the mixed fuel amount Sk, which is separately calculated (estimated) by using the routine in FIG. 7. Next, the EG proceeds to step 1120 to determine the intermittency allowance temperature Tkyoka based on the mixed fuel amount Sk and the lookup-table MapTkyoka(Sk). In other words, the EG determines the intermittency allowance temperature Tkyoka by applying the mixed fuel amount Sk to "the table MapTkyoka(Sk) illustrated in the block of step 1120 in FIG. 11".

According to the table MapTkyoka(Sk), the intermittency allowance temperature Tkyoka is determined to be the constant value T0 when the mixed fuel amount Sk is smaller than the predetermined value Sk0. Furthermore, the intermittency allowance temperature Tkyoka is determined to rise with increasing amount of the mixed fuel amount Sk when the mixed fuel amount Sk is equal to or larger than the predetermined value Sk0, according to the table MapTkyoka (Sk). After that, the CPU proceeds to step 1195 to end this routine once.

As described above, in the first modified embodiment, the intermittency allowance temperature Tkyoka is continuously (i.e., not discretely) increased with increasing amount of the mixed fuel amount Sk.

Second Modified Embodiment

Next, second modified embodiment of the hybrid vehicle according to the above embodiment will be described below. The second modified embodiment is different from the above embodiment only in that the EG executes the "estimation of the mixed fuel amount" routine indicated by the flowchart in FIG. 12 in place of that in FIG. 7. Hence, the following descriptions will be mainly concerned this difference.

Figure 12:
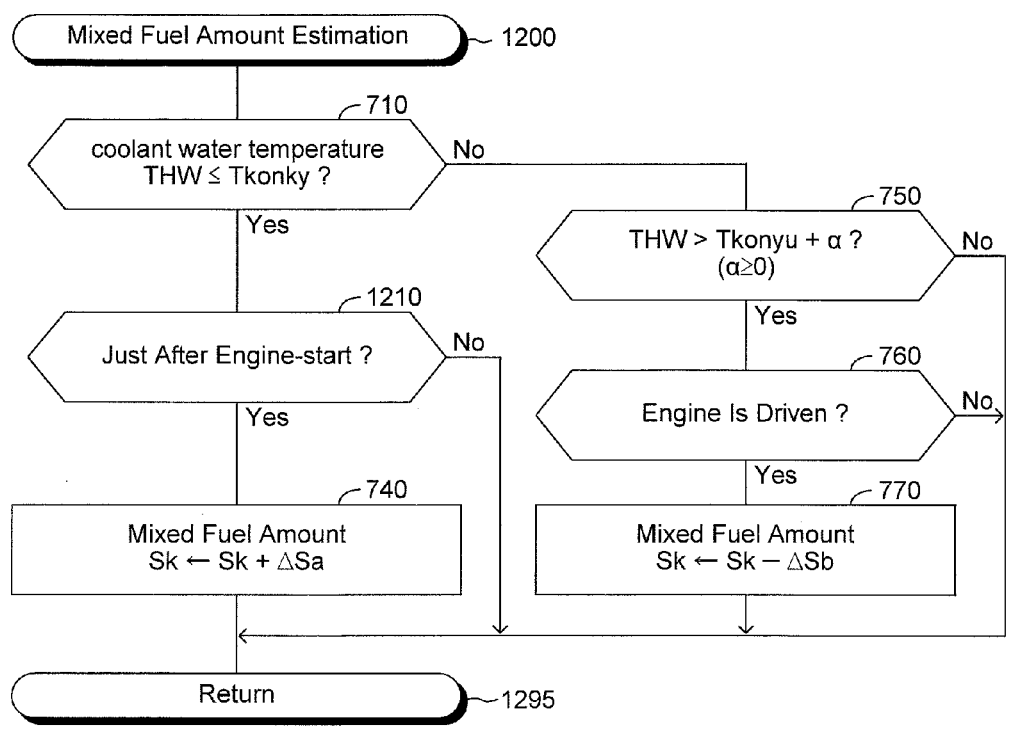
FIG. 12 is a flowchart illustrating a routine executed by a CPU of a power management ECU of a hybrid vehicle according to second modified example of the embodiment of the invention.

The EG starts a process at step 1200 in FIG. 12 at a predetermined time, proceeds to step 710, and then determines whether or not the coolant water temperature THW is equal to or smaller than the first threshold coolant water temperature Tkonyu. When the coolant water temperature THW is equal to or lower than the threshold coolant water temperature Tkonyu, the EG determines as "Yes" at step 710, proceeds to step 1210, and determines whether or not "the present time is just after the engine-start in the case that the engine 20 is not driven".

When the present time is just after the engine-start, the EG determines as "Yes" at step 1210, proceeds to step 740, and then calculates and estimates new mixed fuel amount Sk by adding the predetermined positive value ΔSa to the mixed fuel amount Sk stored at that moment (previous time value of the mixed fuel amount Sk). After that, the EG proceeds to step 1295 to end this routine once. To the contrary, when the present time is not just after the engine-start, the EG determines as "No" at step 1210, and proceeds to step 1295 to end this routine once. The other processes are the same as the routine in FIG. 7.

As above, in the second modified embodiment, the mixed fuel amount Sk is increased by the predetermined value ΔSk at every time when the engine 20 is started under the condition that the coolant water temperature THW is equal to or lower than the threshold coolant water temperature Tkonyu.

As described above, the hybrid vehicle 10 according to this embodiment comprises:

an internal combustion engine 20 including: an in-cylinder fuel injection valve 23 to allow direct fuel injection in a combustion chamber, and a crank ventilation system 29;

a motor (the second motor generator MG2);

a power transmission mechanism (the power distribution mechanism 30 and the power transmission mechanism 50) connecting a drive shaft 53 of the vehicle and the engine 20 to allow torque transmission therebetween and connecting the drive shaft 53 and the motor MG2 to allow torque transmission therebetween; and a control device having a configuration:

to control output torque Te of the engine 20 and output torque Tm2 of the motor MG2 so as to exert an equal torque to "a user requiring torque Tu* on the drive shaft 53, which is a torque required on the drive shaft 53 and determined depending on an acceleration control amount by the user", and to stop the engine 20 when a predetermined engine stop condition is satisfied (see step 320, step 365 to step 375 in FIG. 3) and start the engine 20 when a predetermined engine start condition is satisfied (see step 320 to step 330 in FIG. 3), which engine stop condition includes a condition of a coolant water temperature of the engine 20 is equal to or higher than a intermittency allowance temperature Tkyoka (for example, a condition that the coolant water temperature THW is the intermittency allowance temperature Tkyoka and the engine requesting power Pe* is equal to or larger than the threshold requesting power Peth).

Furthermore, the control device further has a configuration:

to estimate a mixed fuel amount Sk, which is an amount of fuel mixed in lubrication oil of the engine 20 (see the routines of FIG. 7 and FIG. 12), and to set the intermittency allowance temperature Tkyoka to rise with increasing amount of the estimated mixed fuel amount Sk (see the routines of FIG. 8 and FIG. 11).

Thus, the hybrid vehicle of this embodiment is able to decrease the number of the start of the engine 20 under the condition that the fuel adhesion to the wall surface of the engine easily occurs (i.e., the temperature of the wall surface is low), when the mixed fuel amount increases to a certain large amount. Thus, the hybrid vehicle is able to avoid excessive increase of the mixed fuel amount. Furthermore, he hybrid vehicle of this embodiment is able to extend the time of the operation of the engine 20 under the condition that the mixed fuel amount decreases (i.e., the temperature of the wall surface is high, then the fuel adhesion does not occur, and the evaporated fuel in the crank case can be returned to the intake system), when the mixed fuel amount increases to a certain large amount. Thus, the hybrid vehicle is able to decrease the mixed fuel amount Sk before the amount Sk reaches to an excessive amount.

The present invention is not limited within the above specific embodiment, various modifications corrections may be made without departing from the scope of the invention. For example, hybrid vehicles employing the present invention do not necessarily have the system of the above embodiment, but may have a configuration to allow the followings: exerting an equal torque to the user requiring torque on the drive shaft 53 by controlling the output torque of the engine and the output torque of the motor; and stopping the engine depending on the situations even when the vehicle is running.

Furthermore, the EG may determine whether or not the total increased amount (Kst+Kthw) is equal to or larger than the threshold increased amount Ktotalth instead of determining whether or not the after-start increased amount Kst is equal to or larger than the threshold increased amount Kstth.

Furthermore, the predetermined positive value ΔSa and the predetermined positive value ΔSb in FIG. 7 may be same or different. Additionally, the positive value ΔSa may be set to increase with decreasing temperature of the coolant water temperature THW. The positive value ΔSa may be set to increase with increasing amount of the after-start increased amount Kst or the total increased amount (Kst+Kthw). Furthermore, the positive value ΔSa may be determined by applying an actual Kst and an actual coolant water temperature THW to a lookup-table that defines relationship between "the after-start increased amount Kst (or the total increased amount (Kst+Kthw)) and the coolant water temperature THW" and "the value ΔSa". The positive value ΔSb in FIG. 7 may be set to increase with increasing temperature of the coolant water temperature THW. Additionally, the first modified embodiment and the second modified embodiment may be combined.

Furthermore, the engine stop condition may be the condition whether or not the followings are satisfied: the coolant water temperature THW is the intermittency allowance temperature Tkyoka; and the engine requesting power Pe* is equal to or larger than a threshold value for stopping the engine (=the value defined by adding a predetermined positive value β to the requiring power Peth). Furthermore, the condition may further include the following: the vehicle speed SPD is equal to or higher than a predetermined vehicle speed SPDth. Additionally, the engine 20 may have a fuel injection valve (so-called port-injection valve) in addition to the in-cylinder fuel injection valve 23.

The invention claimed is:
1. A hybrid vehicle comprising:
an internal combustion engine including: an in-cylinder fuel injection valve to allow direct fuel injection in a combustion chamber, and a crank ventilation system;
a motor;
a power transmission mechanism connecting a drive shaft of the vehicle and the engine to allow torque transmission therebetween and connecting the drive shaft and the motor to allow torque transmission therebetween; and
a control device having a configuration:
to control output torque of the engine and output torque of the motor so as to exert an equal torque to a user requiring torque on the drive shaft, the user requiring torque being a torque required on the drive shaft and determined depending on an acceleration control amount by the user, and
to stop the engine upon a predetermined engine stop condition being satisfied and start the engine upon a predetermined engine start condition being satisfied, the engine stop condition including a condition of a coolant water temperature of the engine being equal to or higher than a intermittency allowance temperature,
the control device further having a configuration:
to estimate a mixed fuel amount, the mixed fuel amount being an amount of fuel mixed in lubrication oil of the engine,
to set the intermittency allowance temperature to rise with increasing amount of the estimated mixed fuel amount,
to calculate an increased amount of fuel in such a manner that the increased amount is increased as temperature of the coolant water decreases, and increase an amount of fuel injected from the in-cylinder fuel injection valve as the increased amount increases, and wherein
the control device calculates the estimated mixed fuel amount in such a manner that the estimated mixed fuel amount is increased when the engine is being driven, the coolant water temperature is lower than a first threshold coolant water temperature, and the increased amount of fuel is equal to or larger than a predetermined threshold increased amount.

2. The hybrid vehicle according to claim 1,
the control device further having a configuration to decrease the estimated mixed fuel amount upon the following conditions being satisfied: the engine being driven, and the coolant water temperature being higher than a second threshold coolant water temperature equal to or higher than the first threshold coolant water temperature.

3. The hybrid vehicle according to claim 1,
the control device further having a configuration to change the intermittency allowance temperature from a low threshold temperature to a high threshold temperature upon the estimated mixed fuel amount being equal to or larger than a threshold mixed fuel amount, the high threshold temperature being higher than the low threshold temperature.

4. A hybrid vehicle comprising:
an internal combustion engine including: an in-cylinder fuel injection valve to allow direct fuel injection in a combustion chamber, and a crank ventilation system;
a motor;
a power transmission mechanism connecting a drive shaft of the vehicle and the engine to allow torque transmission therebetween and connecting the drive shaft and the motor to allow torque transmission therebetween; and
a control device having a configuration:
to control output torque of the engine and output torque of the motor so as to exert an equal torque to a user requiring torque on the drive shaft, the user requiring torque being a torque required on the drive shaft and determined depending on an acceleration control amount by the user, and
to stop the engine upon a predetermined engine stop condition being satisfied and start the engine upon a predetermined engine start condition being satisfied, the engine stop condition including a condition of a coolant water temperature of the engine being equal to or higher than a intermittency allowance temperature,
the control device further having a configuration:
to estimate a mixed fuel amount, the mixed fuel amount being an amount of fuel mixed in lubrication oil of the engine,
to set the intermittency allowance temperature so as to have the intermittency allowance temperature become higher as the estimated mixed fuel amount increases, and wherein
the control device calculates the estimated mixed fuel amount in such a manner that the estimated mixed fuel amount is increased as the number of start of the engine, under a condition that the coolant water temperature is equal to or lower than the first threshold coolant water temperature, increases.

5. The hybrid vehicle according to claim 4,
the control device further having a configuration to decrease the estimated mixed fuel amount upon the following conditions being satisfied: the engine being driven, and the coolant water temperature being higher than a second threshold coolant water temperature equal to or higher than the first threshold coolant water temperature.

6. The hybrid vehicle according to claim 4,
the control device further having a configuration to change the intermittency allowance temperature from a low threshold temperature to a high threshold temperature upon the estimated mixed fuel amount being equal to or larger than a threshold mixed fuel amount, the high threshold temperature being higher than the low threshold temperature.

\* \* \* \* \*